United States Patent
Bruns

(10) Patent No.: US 8,770,645 B2
(45) Date of Patent: Jul. 8, 2014

(54) BACK ASSEMBLY FOR WHEELCHAIR USERS FOR INSTALLATION IN MOTOR VEHICLES

(75) Inventor: Gerit Bruns, Bad Zwischenahn (DE)

(73) Assignee: AMF-Bruns GmbH & Co. KG, Apen (DE)

( * ) Notice: Subject to any disclaimer, the term of this patent is extended or adjusted under 35 U.S.C. 154(b) by 0 days.

(21) Appl. No.: 13/492,375

(22) Filed: Jun. 8, 2012

(65) Prior Publication Data

US 2013/0328340 A1    Dec. 12, 2013

(51) Int. Cl.
*B60N 2/30*    (2006.01)
*B60N 2/64*    (2006.01)

(52) U.S. Cl.
CPC ........... *B60N 2/3015* (2013.01); *B60N 2/64* (2013.01)
USPC ................... 296/65.01; 296/65.13; 296/65.16

(58) Field of Classification Search
USPC ............... 296/19, 35.2, 65.01, 65.03, 65.04, 296/65.13, 65.16, 68.1; 297/230.1, 230.12, 297/230.14, 283.3, 395, DIG. 4; 414/921
See application file for complete search history.

(56) References Cited

U.S. PATENT DOCUMENTS

| | | | | | |
|---|---|---|---|---|---|
| 3,922,029 | A | * | 11/1975 | Urai | 296/68.1 |
| 5,026,225 | A | * | 6/1991 | McIntyre | 410/23 |
| 6,073,986 | A | * | 6/2000 | Neale et al. | 296/63 |
| 6,209,943 | B1 | * | 4/2001 | Neale et al. | 296/65.01 |
| 7,112,022 | B1 | * | 9/2006 | McLoughlin et al. | 410/96 |
| 7,909,382 | B2 | * | 3/2011 | Kanamori et al. | 296/65.05 |
| 2004/0222657 | A1 | * | 11/2004 | Welch et al. | 296/68 |
| 2011/0204688 | A1 | * | 8/2011 | Undevik | 297/230.1 |

FOREIGN PATENT DOCUMENTS

| | | |
|---|---|---|
| CH | 702900 A2 | 9/2011 |
| DE | 8700698 U1 | 6/1987 |
| DE | 19930048 C1 | 7/2000 |
| DE | 102005048143 A1 | 4/2007 |
| DE | 202005016461 U1 | 4/2007 |
| DE | 202008001539 U1 | 4/2009 |
| DE | 102005009119 B4 | 7/2011 |
| EP | 1777100 A1 | 4/2007 |
| GB | 2102743 A | 2/1983 |

OTHER PUBLICATIONS

German Patent Office, Search Report in German Application No. 202011101394.8 issued on Feb. 22, 2012, 8 pages.
European Patent Office, Search Report issued in related European patent application No. 12171402.6 dated Nov. 16, 2012.

* cited by examiner

*Primary Examiner* — Glenn Dayoan
*Assistant Examiner* — Jason S Daniels
(74) *Attorney, Agent, or Firm* — Wood, Herron & Evans LLP

(57) ABSTRACT

A backrest arrangement for installation in a motor vehicle for transporting wheelchair users, and a motor vehicle including the backrest arrangement. The backrest arrangement includes a fixing device that attaches the backrest arrangement to the roof of the motor vehicle. A backrest is mounted to the fixing device and is configured to support a wheelchair user. The backrest is rotatably mounted to the fixing device by a telescoping bar. The backrest may thereby be moved between a stowage position and a substantially extended operative position by rotating the backrest down from the stowage position and extending the telescoping bar. While in the stowage position, the backrest may be disposed completely in the roof region of the motor vehicle so that the backrest arrangement does not take up space in the passenger region.

19 Claims, 8 Drawing Sheets

BACK ASSEMBLY FOR WHEELCHAIR USERS FOR INSTALLATION IN MOTOR VEHICLES

TECHNICAL FIELD

The invention concerns a backrest arrangement for installation in a motor vehicle for conveying wheelchair users and a motor vehicle having such a backrest arrangement.

BACKGROUND

For transporting wheelchair users in motor vehicles it is known for a wheelchair user together with his wheelchair to be pushed into a motor vehicle of suitable size, for example by means of a ramp or a lift device, and there secured to prevent slippage. Backrest arrangements are also known which are fixed to the vehicle and which, if required, are extended against the back of the wheelchair user in a seated position. Particularly in the case of sudden braking or a traffic accident involving the motor vehicle, such a backrest arrangement offers support for the back and head region of the wheelchair user so that the user is not flung rearward.

Utility model DE 20 2005 016 461.5 to the present applicant describes such a backrest arrangement in which the backrest is fitted to a side wall of a motor vehicle by means of pivotal arms. The pivotal arms are pivotable about a vertical axis and make it possible for the backrest to be pivoted out if required to the back position of the wheelchair user as soon as the latter has assumed the final seating position in the motor vehicle. The backrest arrangement somewhat constricts the vehicle interior, in particular if no wheelchair users are to be transported. In addition, fixing the backrest to the side wall has the disadvantage that the weight of the backrest acts on the vehicle wall by way of the lever of the pivotal arms. The fixing to the vehicle wall must therefore be of a correspondingly large nature depending on the respective weight and lever length involved. Short pivotal arms admittedly reduce the lever effect, but at the same time reduce the adjustability of the backrest position transversely to the direction of travel. The wheelchair user therefore always has to sit against the vehicle wall. Particularly wide wheelchairs could project laterally beyond the backrest arrangement and be inadequately supported.

Backrests are also known that are inserted into the vehicle floor behind the respective wheelchair so that the wheelchair user and the wheelchair are arranged and fixed immediately in front of the backrest. A disadvantage in that respect is the difficulty in handling such backrests. To move a wheelchair in and out of the vehicle, it is necessary for such a plug-in backrest to be removed from its position and put into intermediate storage elsewhere. In addition, such a backrest is really far from the inserted position in the vehicle floor. Suitably sturdy supports are thus required to be able to carry the correspondingly high forces produced by the head part, which is at the top of the backrest.

SUMMARY

An object of the invention is to provide a backrest arrangement which does not suffer from these disadvantages.

This object is attained by means of a backrest arrangement of the kind set forth in the opening part of this specification, comprising a fixing device for fixing the backrest arrangement to the roof of the motor vehicle, and a backrest mounted to the fixing device for supporting a wheelchair user, wherein the backrest is movable between a stowage position of being stowed on the fixing device and a substantially extended operative position.

The backrest arrangement is designed so that the backrest arrangement can be fixed to the roof of a motor vehicle by means of the fixing device, and in the stowage position is disposed completely in the region of the roof of the motor vehicle. In that way, the backrest arrangement does not take up any space in the region of the seat position of the wheelchair user or passengers. If required, the seat region can also be fitted with seats for passengers that are not disabled. In addition, the arrangement can be variably fixed within a motor vehicle so that the wheelchair user can freely determine his seat position within the motor vehicle. The wheelchair user therefore does not necessarily have to sit in the region of the vehicle wall. In the extended operative position, the backrest is at the back position of the wheelchair user so that the backrest supports the back and head of the wheelchair user. In addition, the backrest can be arranged so that the wheelchair user can sit in, or in opposite relationship to, the direction of travel. The movement of the backrest from the stowage position into the operative position advantageously includes pivotal movement, extensible movement, fold-out, or roll-out movement. Depending on the respective design configuration of the backrest, backrests which are foldable, which can be rolled together, or which can be plugged one into the other could also be advantageous.

The fixing device affords high stability and load-bearing capability in order to achieve a secure fixing for the backrest arrangement to the roof of the motor vehicle. The fixing device is designed to safely carry the force due to the weight of the backrest and the moments or forces occurring in operation. Preferably, the fixing device can be fixed to carrier structure components of a motor vehicle.

An advantageous development of the backrest according to the invention provides that the backrest is mounted to the fixing device rotatably about the horizontal pivot axis. The rotatability or pivotability of the backrest about the horizontal pivot axis permits particularly ergonomic operability of the backrest.

A further advantageous configuration of the backrest arrangement according to the invention has a backrest which is oriented substantially horizontally in the stowage position. By means of that design, the backrest is disposed in a particularly compact and space-saving fashion in the stowage position, and in particular, under the roof of the vehicle. Preferably, the backrest is oriented parallel to the fixing device while the backrest is in the stowage position.

A further preferred embodiment of the backrest arrangement according to the invention includes a backrest which is displaceable in the horizontal direction of movement. In this way, the operative position the backrest can be particularly easily and variably adapted to the seat position of the wheelchair user. In the stowage position, the horizontal displaceability of the backrest also offers the advantage that the stowage position of the backrest can be varied in the horizontal direction or in a horizontal plane depending on the respective space requirement at the roof of the motor vehicle.

Another advantageous configuration of the backrest according to the invention is one in which the fixing device has at least one rail, the backrest being displaceable along the rail. Horizontal displaceability of the backrest can thereby be implemented in a stable and ergonomic fashion.

A particularly advantageous embodiment of the backrest according to the invention is one in which the fixing device has two mutually spaced and parallel rails. By means of this embodiment, horizontal displaceability of the backrest can be implemented in a particularly stable and ergonomic fashion.

A further embodiment of the backrest arrangement according to the invention comprises a carriage which is suspended in the rails for displacement of the backrest. The carriage advantageously permits stable fixing of the backrest to the fixing device, and at the same time affords a simple stable way of horizontally displacing the backrest. Preferably, the telescopic bar is fixed rotatably to the carriage and is rotatable about a horizontally extending axis and/or about its own longitudinal axis. In this way, the telescopic bar achieves variable adaptability of the backrest in the operative and stowage positions.

A development of the backrest arrangement according to the invention is afforded by means of a further advantageous embodiment in which the backrest is mounted to a telescopic bar, and the telescopic bar is connected to the fixing device. The telescopic bar permits the height of the backrest to be variably adapted to the back position of the wheelchair user. In addition, the telescopic bar allows an additional possible way of stowing the backrest in the stowage position in a compact and space-saving fashion.

A further advantageous embodiment of the backrest according to the invention includes a carriage having at least one rotary lock co-operating with a rail to arrest the carriage on the rail in different positions. In that way, the carriage can be quickly and securely arrested manually on the fixing device.

An additional advantageous embodiment of the backrest arrangement according to the invention is one that has a securing member which is mounted to the carriage. The securing member can be brought into engagement in a recess on the telescopic bar at least in the stowage position and in the operative position of the backrest. In that way, the securing member provides that the backrest is securely arrested in said positions. Preferably, the securing member comes into engagement with a recess on the telescopic bar automatically as soon as the telescopic bar is in the stowage position or operative position, respectively. Automatic securing of the telescopic bar, and therewith the backrest, increases the aspect of safety in use of the backrest arrangement. In addition, the securing member can be brought out of engagement manually again to release the arresting action in relation to the telescopic bar.

An additional advantageous development of the backrest arrangement according to the invention provides that the backrest is rotatably damped by means of a rotary damper or a gas spring. The damped rotation of the backrest prevents the backrest from abruptly dropping down, and has a supporting effect in moving the backrest from the stowage position into the operative position.

Another advantageous embodiment of the backrest arrangement according to the invention is one having a safety belt which can be at least partially fixed to the backrest. The safety belt affords an additional hold in the event of sudden braking or traffic accidents, and thus enhances the safety of the wheelchair user. Preferably the safety belt is in the form of a three-point safety belt.

An additional advantageous embodiment of the backrest arrangement according to the invention has a head support fixed displaceably to the telescopic bar. In that way, the backrest arrangement can be variably adapted to the particular anatomical characteristics of the wheelchair user.

A second aspect of the invention concerns a motor vehicle for transporting wheelchair users. The motor vehicle includes at least one backrest arrangement comprising a fixing device for fixing the backrest arrangement to the roof of the motor vehicle, and a backrest mounted to the fixing device for supporting a wheelchair user. The backrest is movable between a stowage position of being stowed on the fixing device, and a substantially extended operative position. The backrest arrangement is also fixed to the roof of the motor vehicle by means of the fixing device.

The motor vehicle can be used in a particularly variable fashion both for wheelchair users and also for passengers without disabilities. Preferably, the backrest arrangement is installed at least partially below the roof cladding of the motor vehicle so that the aesthetics of the interior space is approximately identical to a factory production version of the motor vehicle. The dimensions of the individual parts of the backrest arrangement can be designed to be adapted individually to space conditions in the interior of the motor vehicle.

An advantageous embodiment of the motor vehicle according to the invention has at least one backrest arrangement as set forth in one of claims 2 through 13, or in accordance with one of the above-described embodiments.

In addition, an advantageous embodiment of the motor vehicle according to the invention is one which is characterised in that the backrest is mounted to the fixing device rotatably about a horizontal pivot axis, wherein the horizontal pivot axis is oriented transversely or parallel to the direction of travel. In combination with very long motor vehicles, this backrest which is pivotable transversely relative to the direction of travel can be particularly comfortably installed and operated. In the case of shorter motor vehicles, the variant of a pivot axis which is oriented parallel to the direction of travel is comfortable in terms of operability and installation. The arrangement of the backrest can be adapted to the orientation of the pivot axis.

A further preferred embodiment of the motor vehicle according to the invention is one in which the rails are arranged parallel and/or transversely relative to the direction of travel. In that way, the backrest can be displaced variably to the seat position of the wheelchair user in a horizontal direction.

A further preferred embodiment of the motor vehicle according to the invention is one in which in the stowage position the backrest bears substantially against the roof of the motor vehicle. This allows particularly compact stowability of the backrest in the stowage position.

Another advantageous embodiment of the motor vehicle according to the invention is one in which the backrest is pivotable in the direction of travel from the stowage position into the operative position. In that way, the backrest can be particularly comfortably pivoted from the stowage position into the operative position against the back of a wheelchair user. The backrest can thereby be positioned from the rear against the back of a wheelchair user sitting in the direction of travel after the user has assumed his seat position. Before the wheelchair user has assumed his seat position, the backrest is in the stowage position so that the backrest is not in the way of the wheelchair user when he moves into the motor vehicle. In that case, the direction of travel corresponds to the forward direction of movement of the vehicle.

Furthermore, an advantageous embodiment is one in which the backrest can be fixed to the roof of the vehicle in the stowage position and/or can additionally be fixed to the floor of the vehicle in the operative position. That way, the backrest can be securely and safely arrested in the stowage or operative position.

BRIEF DESCRIPTION OF THE DRAWINGS

The invention is described in detail hereinafter by means of embodiments by way of example and drawings in which.

DETAILED DESCRIPTION

Figure 1:
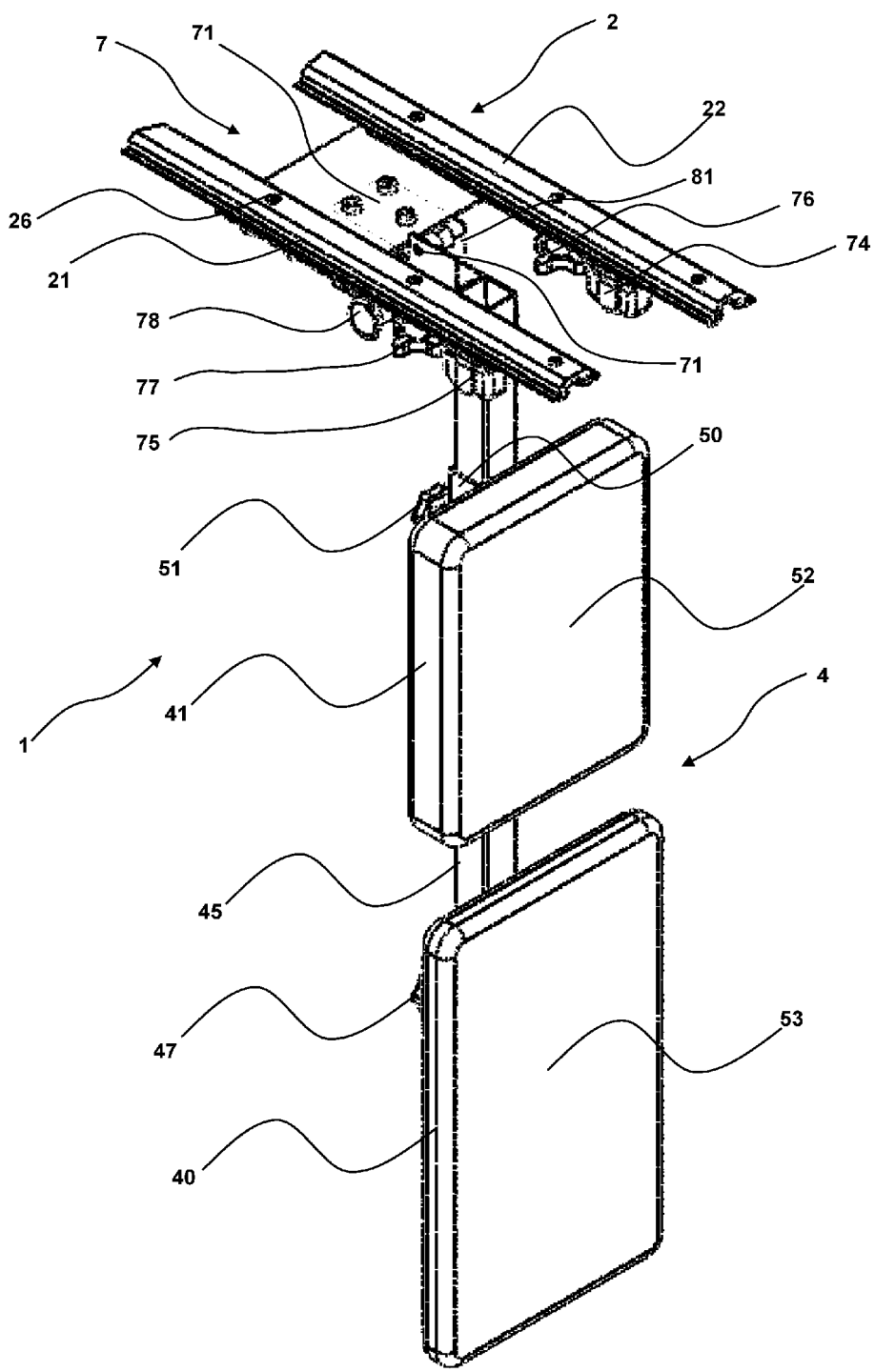
FIG. 1 is a perspective view of an embodiment of a backrest arrangement in the operative position and according to an embodiment of the invention.

FIG. 1 shows a backrest arrangement 1 for installation in a motor vehicle 100 (FIG. 7) for transporting wheelchair users. The backrest arrangement 1 comprises a fixing device 2 for fixing the backrest arrangement 1 to the roof of the motor vehicle 100, and a backrest 4 mounted to the fixing device 2 for supporting a wheelchair user. The backrest 4 is movable between a stowage position of being stowed on the fixing device 2 (see FIG. 5) into a substantially extended operative position.

The fixing device 2 has two profiled flat bars 21, 22 which are arranged parallel to each other and spaced from each other. A configuration for the fixing device 2 would also be conceivable that has only one flat bar, more than two flat bars, or which is in the form of a plate. The flat bars 21, 22 have a hat-shaped profile. The central flat portion on the outside forms a connecting surface on the flat bars 21, 22 for mounting to the motor vehicle 100. Each connecting surface has three bores 26. The bores are arranged at uniform spacings relative to each other in the longitudinal direction or along the longitudinal axis of the flat bar 21, 22, and are located approximately centrally relative to the width of the respective central flat portion of the flat bar 21, 22. For fixing the flat bars 21, 22, a respective screw is passed through a bore 26 from the underside 25 (see FIG. 2) of the flat bars 21, 22 and brought into engagement at the roof 102 of the motor vehicle 100. Depending on the respective dimensions of the flat bars 21, 22 and the weight of the backrest arrangement, it is also possible to have more than three bores 26 for each flat bar 21, 22.

Figure 4:
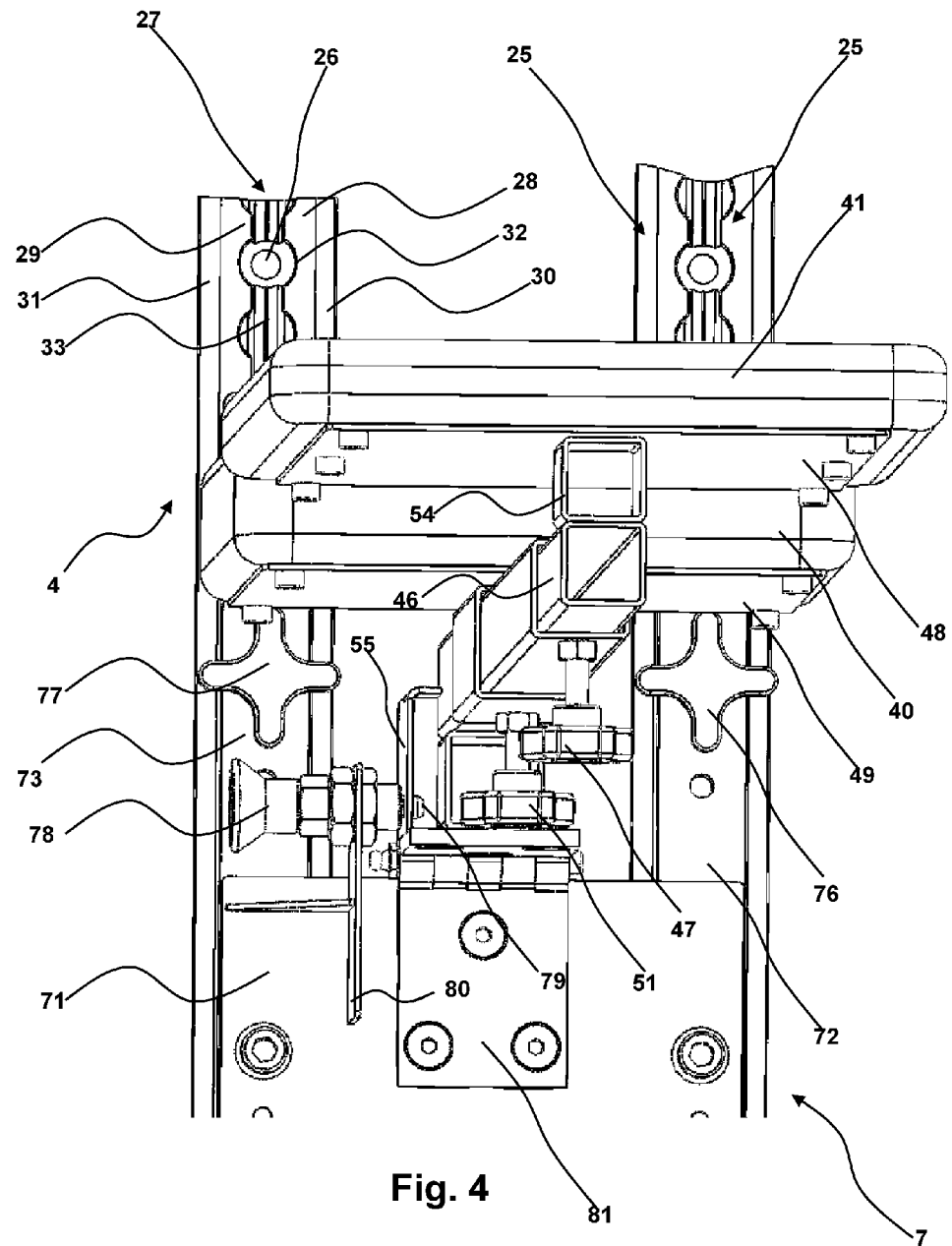
FIG. 4 is a view from below of the embodiment of FIGS. 1-3 in the operative position.

As shown in FIG. 4, provided at the underside 25 of each flat bar 21, 22 in the hollowed-out region of the hat profile is a rail 27. The rail 27 has two oppositely disposed flanges 28, 29 which extend over the entire length of each flat bar 21, 22. The flanges 28, 29 are respectively mounted at laterally projecting flange portions 30, 31 at the underside 25 of the bore 26, and are of such dimensions that an access 33 to the hollowed-out region remains free between the flanges 28, 29. Part-circular cutouts 32 are provided at regular spacings in the flanges 28, 29. The cutouts 32 and the flanges 28, 29 are of such dimensions and arrangement that they correspond to the bores 26 and facilitate insertion of the screws or fixing of the flat bars 21, 22.

Figure 6:
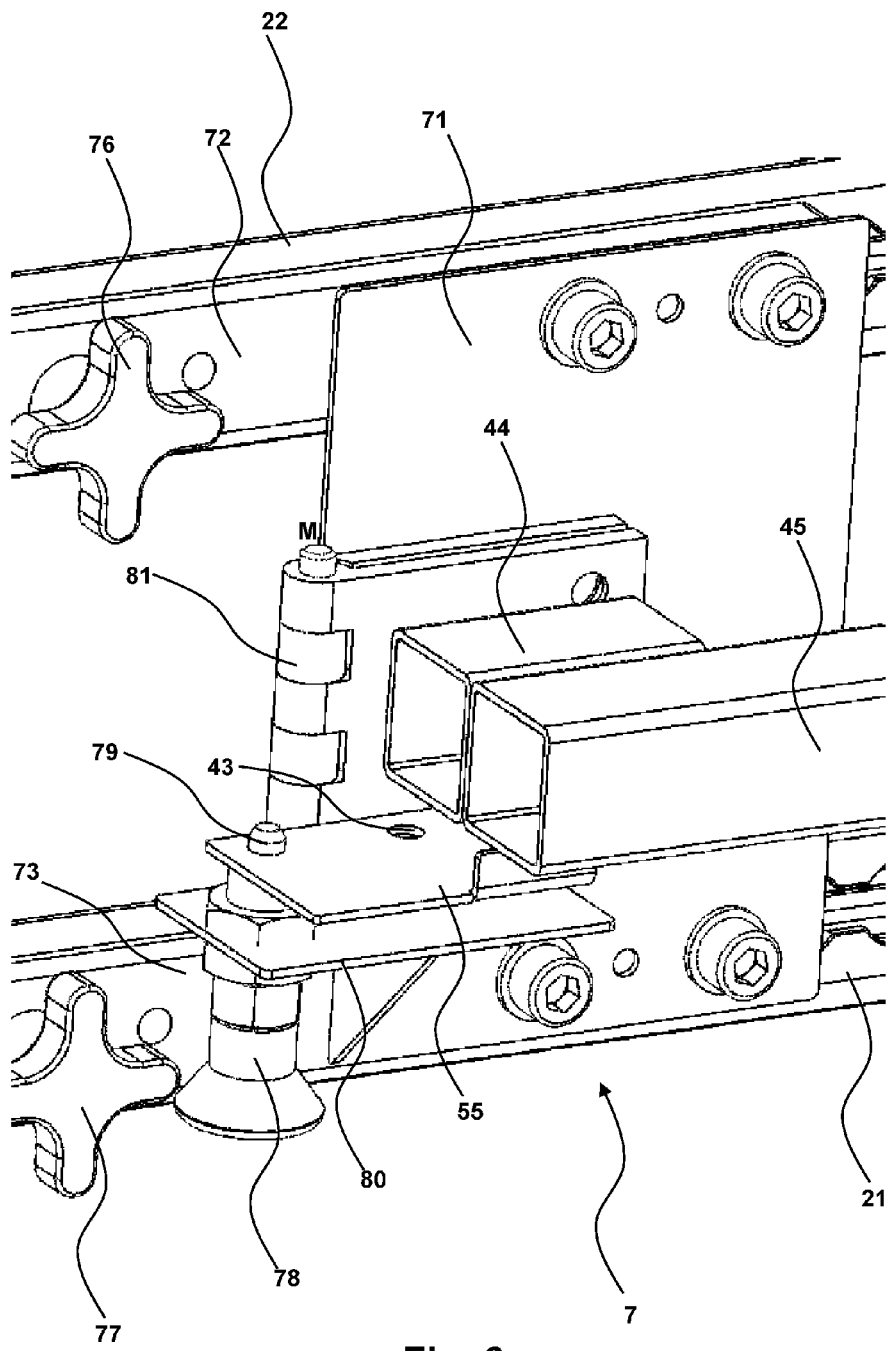
FIG. 6 is a perspective view on an enlarged scale of the carriage of the embodiment of FIGS. 1-5.

FIGS. 4 and 6 show a carriage 7 for displacement of the backrest 4 in the horizontal direction. The carriage 7 is suspended in the rails 27 and includes a carriage plate 71, two carriage sliders 72, 73 movable relative to the rails 27, two rotary locks 74, 75 and two tightening screws 76, 77.

The carriage sliders 72, 73 are suspended in the rails 27 of the flat bars 21, 22. In addition, the carriage sliders 72, 73 are of a rectangular basic profile, the width of which substantially corresponds to the width of the rail 27, and the length of which is approximately double that of the carriage plate 71. The Figures do not show a carrier element of the carriage sliders 72, 73, which bears against the flanges 28, 29 of the rails 27 within the hollowed-out region of the flat bars 21, 22. In this embodiment, the carrier element is in the form of a flat bar member and is connected by means of a neck portion which is narrower than the access 33 to the portion of the carriage sliders 72, 73. Carrier elements which are in the form of rollers or other sliding devices would also be conceivable.

Disposed on each carriage slider 72, 73 at a spacing from the carriage plate 71 is the respective rotary lock 74, 75 and the tightening screw 76, 77. The rotary lock 74, 75 is respectively arranged at the end of the carriage sliders 72, 73. The tightening screws 76, 77 in contrast are disposed approximately in the center of the carriage sliders 72, 73 between the slider plate 71 and the rotary lock 74, 75. The rotary locks 74, 75 respectively co-operate with the rail 27 to arrest the carriage 7 in various positions on the fixing device 2. For manual setting of the rotary locks 74, 75, there is provided a handle with a handle surface which is adequate for an average hand. Preferably, as shown here, the handle is of an ergonomic configuration of a cuboidal shape with rounded edges and a raised central region. The tightening screws 76, 77 press or urge the carriage 71 against the flat bars 21, 22, which prevents the carriage 7 from chattering. The tightening screws 76, 77 are manually displaceable. For that purpose, they have a cross-shaped handle.

The carriage plate 71 is in the form of a rectangular plate member and is fixed to the two carriage sliders 72, 73 by means of a plurality of screws. In this embodiment, the carriage plate 71 is arranged at the end of the carriage sliders 72, 73. The width of the carriage plate 71 is such that it terminates flush with the outside edges of the carriage sliders 72, 73, as shown in FIG. 4.

A securing member 78 is mounted to the carriage 7 or in this embodiment to the carriage plate 71. The securing member 78 can be brought into engagement in one of a plurality of recesses 43 on a telescopic bar 42 of backrest 4 at least in the stowage and operative positions of the backrest 4. For that purpose the securing member 78 has a pin 79 oriented parallel to the axis of rotation M of the backrest 4, or perpendicularly to the longitudinal axes of the flat bars 21, 22. The securing member 78 is screwed to a holder 80 welded to the carriage plate 71. In addition, the securing member 78 is biased in the direction of its longitudinal axis by means of a spring in the interior of the securing member 78. The biasing effect causes the pin 79 to automatically come into engagement in the recess 43 as soon as the recess is oriented coaxially with the pin 79, thereby activating the securing action. To de-activate the securing system, manual actuation of the securing member 78 against the spring force is necessary. For that purpose, the securing member 78 has a conically shaped handle arranged adjacent to the flat bar 21.

Figure 3:
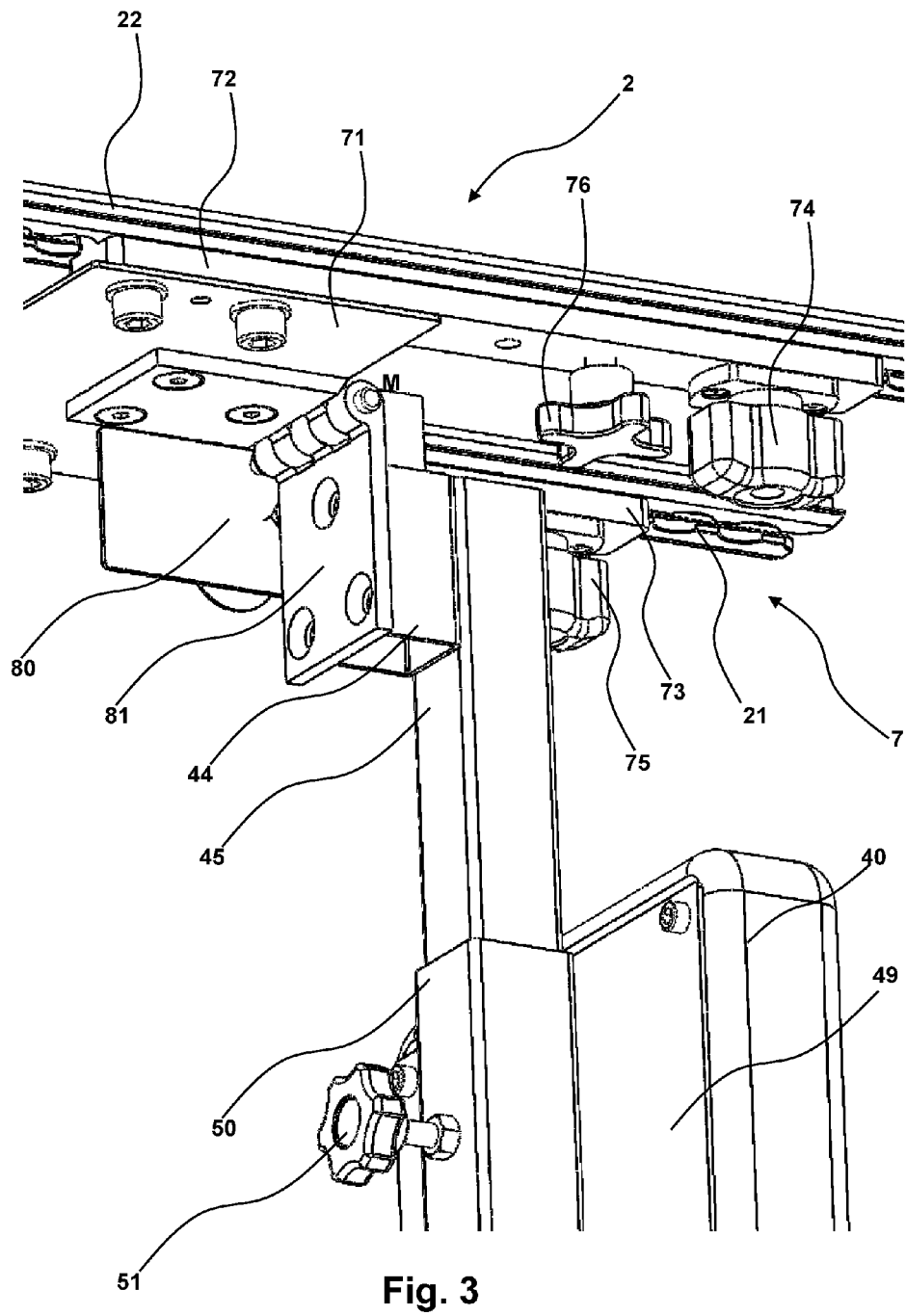
FIG. 3 is a perspective view on an enlarged scale of a portion of the fixing device of the embodiment of FIGS. 1 and 2.
Figure 5:
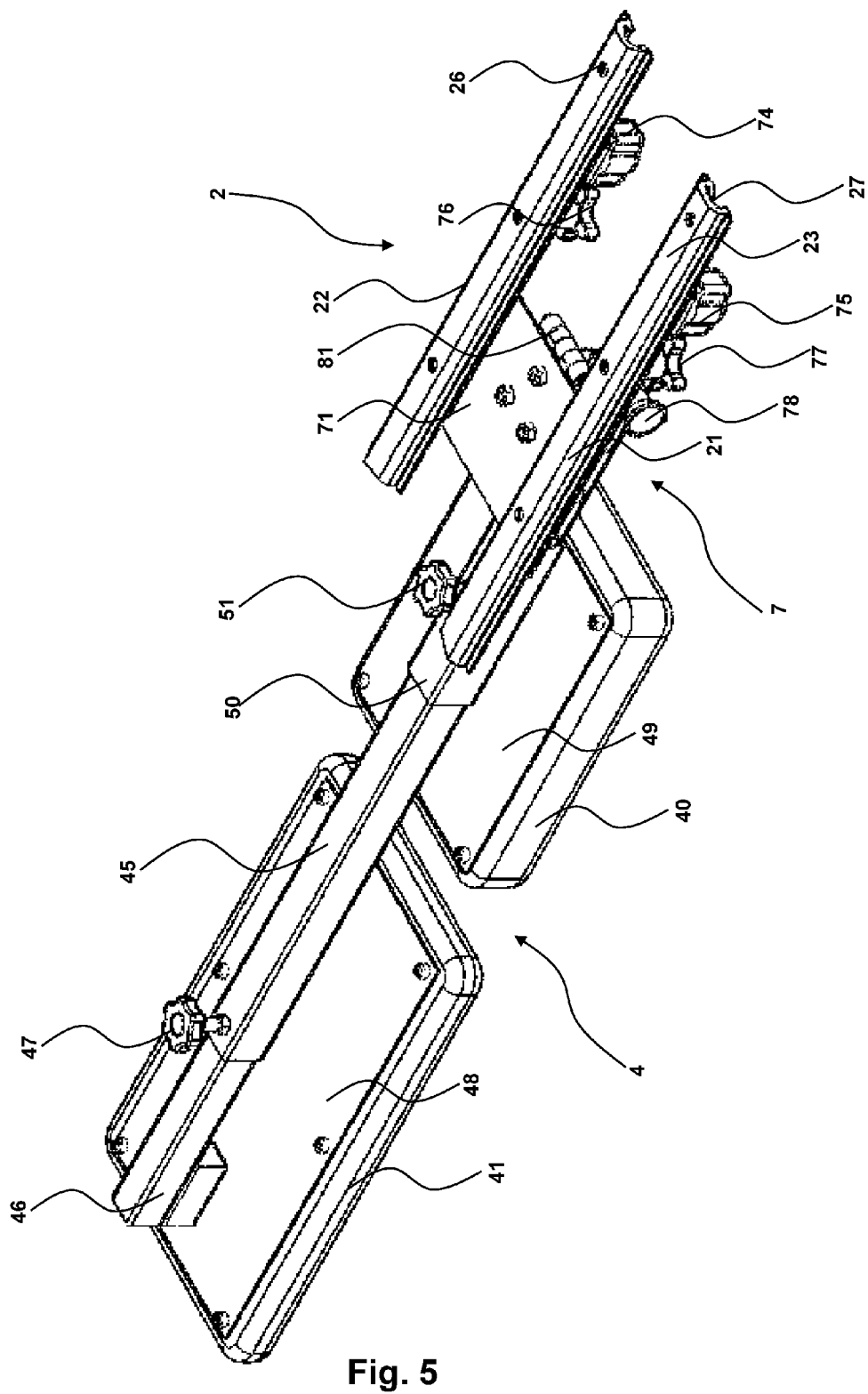
FIG. 5 is a perspective view of the embodiment in the stowage position.

A hinge 81 is screwed or fixed to the carriage plate 71, whereby the backrest 4 is rotatably mounted to the fixing device 2 about a horizontal pivot axis M. The axis of rotation M of the hinge 81 is in a horizontal plane and is oriented perpendicularly to the longitudinal axes of the flat bars 21, 22. An alternative embodiment with an axis of rotation oriented parallel to the flat bars 21, 22 would also be conceivable. The hinge 81 is pivotable in the range of between at least 0° and 90°. Larger pivotal ranges would also be conceivable. As best shown in FIGS. 5 and 6, at an angular position of 0°, the two hinge plates bear against each other, and the backrest 4 is in the stowed position. As best shown in FIG. 3, in the operative position of the backrest 4, the hinge plates are at an angle of 90°. The hinge 81 on the carriage plate 71 is arranged approximately at the height of the center of the carriage sliders 72, 73. In this embodiment, the hinge 81 is fixed to an inwardly disposed end 84 of the carriage plate 71 and centrally relative to the width of the carriage plate 71 so that the weight is distributed substantially uniformly to the fixing device 2 and the two flat bars 21, 22.

The telescopic bar 42 is fixedly coupled to the hinge 81 by means of a connecting portion 44. The connecting portion 44 is welded to the telescopic bar 42 and the hinge 81, although a screw or other positively locking connection would also be conceivable. In the stowage position, the connecting portion 44 forms a spacing between the telescopic bar 42 and the fixing device 2. The size of the spacing is such that the telescopic bar or parts fitted thereto are spaced evenly in the stowage position from the fixing device 2 or the plane in which the fixing device 2 is disposed. The connecting portion 44 is made from a rectangular tube and substantially corresponds to the basic shape of the telescopic bar 42. The telescopic bar 42 includes two portions 45, 46. The portions are displaceable one in the other and for that purpose are of cross-sections of different sizes. The cross-section of the outwardly arranged portion 46 is smaller than that of the inner portion 45. The outer portion 46 can be force-lockingly connected to the inner portion 45 by means of a securing screw 47. A positively locking arresting action between the two portions by means of a securing pin or screw, which can be brought into engagement in a bore corresponding thereto on the outer portion 46, would also be conceivable. In this way, the portions 45, 46 can be arrested in a predetermined position relative to each other.

The backrest 4 is mounted to the telescopic bar 42 and coupled or connected to the fixing device 2 by means of the telescopic bar 42 and the carriage 7. The backrest 4 is displaceable in a horizontal direction of movement or is slidable along the rails 21, 22. Rotary dampers and/or gas springs (not shown) may provide a means by which the backrest 4 is rotatable in damped relationship.

The backrest 4 includes a back support 40 and a head support 41. The back and head supports 40, 41 are of a rectangular basic shape and have a respective support plate 48, 49 at their respective sides towards the telescopic bar 42. The support plate 48 of the back support 40 is connected to the outer portion 46 of the telescopic bar 42 by means of a second connecting portion 54. The connecting portion 54 is mounted to the free end of the outer portion 47. The head support 41 is displaceably fixed to the telescopic bar 42. For that purpose the support plate 49 of the head support 41 is connected to the inner portion 45 of the telescopic bar 42 by means of a sleeve 50 that portion-wise embraces the inner portion 45 of the telescopic bar 42. The sleeve 50 is in the form of a quadrangular profile member. The head support 41 can be fixed to the telescopic bar 42 by means of a positively locking connection, such as a securing screw 51 which presses the sleeve 50 against the telescopic bar 42.

Figure 2:
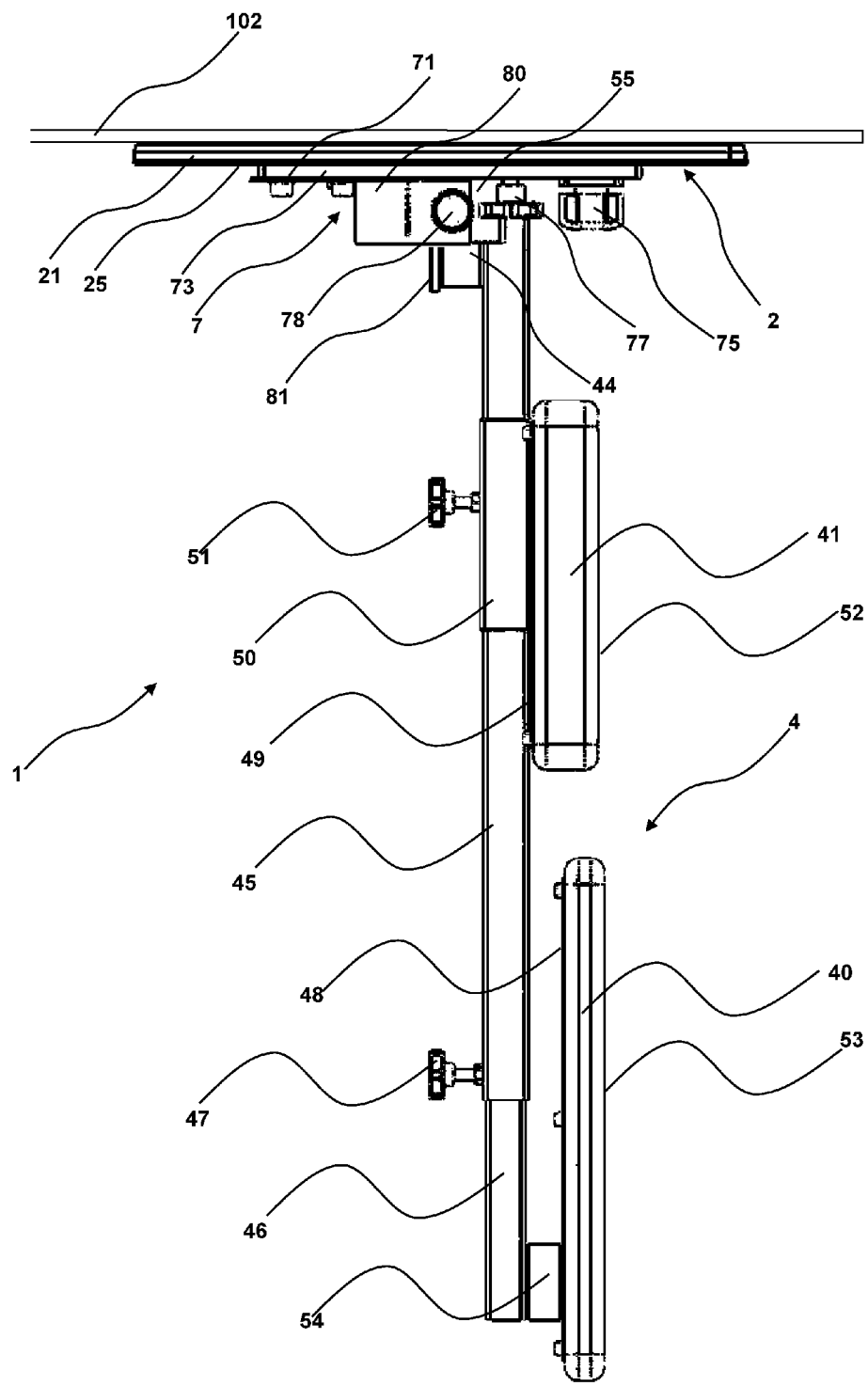
FIG. 2 is a side view of the embodiment of FIG. 1 in the operative position with a diagrammatic view of a portion of a motor vehicle.

The width of the back and head supports 40, 41 are substantially identical. The height of the back support 40 is approximately a third higher than that of the head support 41. The back support 40 is thinner than the head support 41 so that, in spite of the larger dimensions of the back support 40, the weight of the back support 40 is not substantially greater than the head support 41. This is particularly advantageous when moving the backrest 4 from the operative position into the stowage position. The back and head supports 40, 41 are oriented relative to each other so that the support surfaces 52, 53 are aligned with each other as shown in FIG. 2. In that respect, the connecting portion 50 compensates for the differing thicknesses of the back and head supports 40, 41. An arrangement would also be conceivable in which the back support 40 is displaced relative to the head support 41, preferably in such a way that the back support 40 is set in front of the head support 41. It is also conceivable for the telescopic bar 42 to be provided with back and head supports from known motor vehicle seats.

Figure 7:
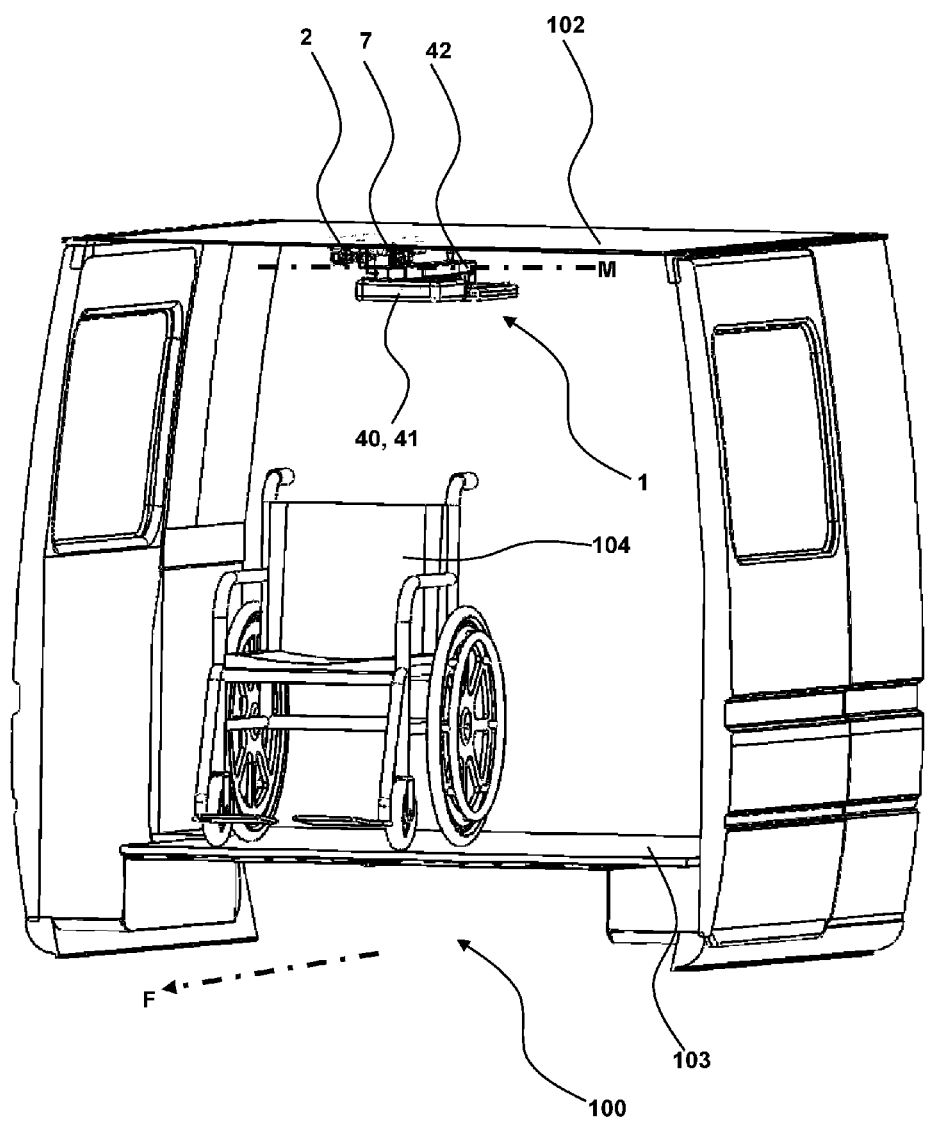
FIG. 7 is a perspective view of an embodiment of a motor vehicle with the backrest arrangement in the stowage position in accordance with the embodiments of FIGS. 1-6.
Figure 8:
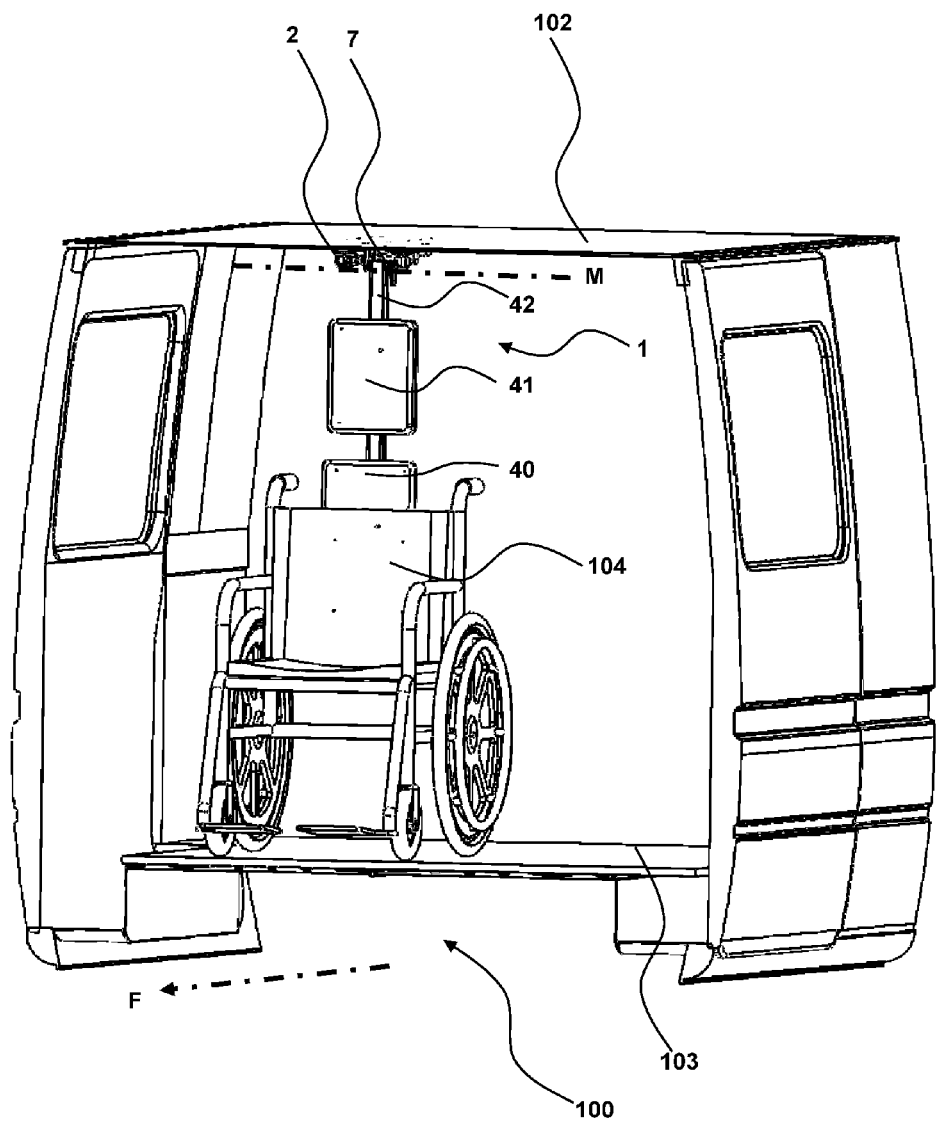
FIG. 8 is a perspective view of the embodiment of the motor vehicle of FIG. 7 with the backrest arrangement in the operative position.

FIGS. 2, 7 and 8 further show an embodiment of a motor vehicle 100 with the above-described embodiment of the backrest arrangement 1 in a condition of being installed to the roof 102 of the motor vehicle 100.

At least one backrest arrangement 1 according to the embodiment is installed within the motor vehicle 100. The backrest arrangement 1 is fixed to the roof 102 of the motor vehicle 100 by means of the fixing device 2. Preferably, the fixing device 2 is screwed or connected to the roof 102 in positively locking relationship. The roof 102 is diagrammatically shown in the Figures in the form of a straight line or surface. However, the backrest arrangement 1 can be fitted to and adapted to different roof shapes. Preferably, the backrest arrangement 1 can be fixed to carrier structures of the motor vehicle 100.

The backrest arrangement 1 is in the stowage position in FIG. 7. Ideally, the backrest 4 is oriented relative to the roof 102 so that the backrest 4 projects as little as possible from the roof 102. For that purpose, the backrest 4 bears substantially against the roof of the motor vehicle 100 in the stowage position. In addition, the backrest 4 is oriented substantially horizontally in the stowage position, and is oriented parallel to the roof 102 of the motor vehicle 100. In addition, the backrest 4 is arranged adjacent to the roof 102. The backrest 4 in the stowage position is spaced from the wheelchair user by such a distance that the wheelchair user is not restricted in his area of movement. The backrest 4 is fixed to the roof 102 of the motor vehicle 100 in the stowage position. Fixing is effected by means of the securing member 78. The length of the backrest 4 is adjustable by means of the telescopic bar 42. In the stowage position, the length of the backrest 4 can be reduced, and in that way the backrest 4 can be stowed in a space-saving compact fashion. For that purpose, the outer portion 46 is pushed into the inner portion 45 of the telescopic bar 42 when the securing screw 47 is in the released position.

The backrest 4 is mounted to the fixing device 2 rotatably about a horizontal pivot axis M, the horizontal pivot axis M being oriented transversely relative to the direction of travel F. The rails 27 are arranged transversely relative to the direction of travel F, but could also be oriented parallel to the direction of travel F. A plurality of rails 27 would also be conceivable, so that the backrest is displaceable both parallel and also transversely relative to the direction of travel F. The backrest 4 is pivotable from the stowage position into the operative position in the direction of travel F. A pivotal movement of the backrest 4 in opposite relationship to the direction of travel F would also be conceivable.

FIG. 8 shows the backrest 4 in the operative position. As shown in FIG. 2, the backrest 4 assumes a substantially vertical position in the operative position. The backrest 4 is displaceable in the horizontal direction within the motor vehicle 100 so that the backrest 4 can be adapted to the seat position of the wheelchair user. The back support 40 is at the outside of the backrest of the wheelchair 104. In addition, the backrest 4 is so oriented that the back support 40 is oriented substantially centrally relative to the outside of the backrest of the wheelchair 104. The height of the back support 40 can be varied by means of the telescopic bar 42. The height of the head support 41 can also be adapted to the head position of the wheelchair user. The backrest 4 can be fixed to the floor of the motor vehicle 100 in the operative position to secure the backrest and to distribute the support force.

A safety belt (not shown) can be partially fixed to the backrest 4. Fitted to the backrest 4 is a belt lock to which a two-point or three-point belt can be fixed. The belt is fitted to the backrest 4 or the motor vehicle 100 and is secured with a belt lock to the backrest 4 for securing the wheelchair user.

The invention claimed is:

1. A backrest arrangement for installation in a motor vehicle having a roof and configured to transport a wheelchair user, the backrest arrangement comprising:
    a fixing device configured to fix the backrest arrangement to the roof of the motor vehicle and including at least one rail; and
    a backrest rotatably mounted to the fixing device so that the backrest is rotatable about a horizontal pivot axis and configured to support the wheelchair user while seated in a wheelchair,
    wherein the backrest is displaceable along the at least one rail and rotatable about the horizontal pivot axis between a stowage position of being stowed on the fixing device and a substantially extended operative position.

2. The backrest arrangement of claim 1 wherein the backrest is oriented substantially horizontally in the stowage position.

3. The backrest arrangement of claim 1 wherein the backrest is displaceable in a horizontal direction of movement.

4. The backrest arrangement of claim 1 further comprising:
    a carriage which is suspended from the at least one rail for displacement of the backrest.

5. The backrest arrangement of claim 4 wherein the carriage has at least one rotary lock that cooperates with the at least one rail to arrest the carriage on the rail in a plurality of different positions.

6. The backrest arrangement of claim 1 wherein the fixing device has a plurality of rails that have a mutually spaced and parallel arrangement, and the backrest is displaceable along the rails.

7. The backrest arrangement of claim 6 further comprising:
    a carriage which is suspended from the rails for displacement of the backrest.

8. The backrest arrangement of claim 1 further comprising:
    a telescopic bar connected to the fixing device, the backrest being mounted to the fixing device by the telescopic bar.

9. The backrest arrangement of claim 8 further comprising:
    a securing member mounted to the carriage and configured to be brought into engagement in a recess on the telescopic bar at least while the backrest is in one of the stowage position or the operative position.

10. The backrest arrangement of claim 8 wherein the backrest includes a head support displaceably fixed to the telescopic bar.

11. A motor vehicle configured to transport a wheelchair user, the motor vehicle comprising:
    a roof; and
    a backrest arrangement that includes a fixing device having at least one rail arranged parallel or transversely to a direction of travel of the motor vehicle, and a backrest rotatably mounted to the fixing device so that the backrest is rotatable about a horizontal pivot axis oriented transversely or parallel to a direction of travel of the motor vehicle, the fixing device configured to fix the backrest arrangement to the roof of the motor vehicle, the backrest configured to the support the wheelchair user while seated in a wheelchair, and the backrest being displaceable along the at least one rail and rotatable about the horizontal pivot axis between a stowage position on the fixing device and a substantially extended operative position.

12. The motor vehicle of claim 11 wherein the backrest bears substantially against the roof of the motor vehicle or is arranged immediately adjacent thereto while in the stowage position.

13. The motor vehicle of claim 11 wherein the backrest is pivotable in the direction of travel from the stowage position into the operative position.

14. The motor vehicle of claim 11 wherein the backrest is fixable to the roof of the vehicle in the stowage position or fixable to the floor of the vehicle in the operative position.

15. The backrest arrangement of claim 1 wherein the backrest has an adjustable length.

16. The backrest arrangement of claim 10 wherein the backrest includes a back support, and the head support is displaceable along the telescopic bar relative to the back support.

17. The motor vehicle of claim 11 wherein the backrest has an adjustable length.

18. The motor vehicle of claim 11 wherein the backrest includes a back support and a head support, and the head support is displaceably fixed to the telescopic bar.

19. The motor vehicle of claim 11 wherein the head support is displaceable along the telescopic bar relative to the back support.

* * * * *

UNITED STATES PATENT AND TRADEMARK OFFICE
CERTIFICATE OF CORRECTION

| | | |
|---|---|---|
| PATENT NO. | : 8,770,645 B2 | Page 1 of 1 |
| APPLICATION NO. | : 13/492375 | |
| DATED | : July 8, 2014 | |
| INVENTOR(S) | : Gerit Bruns | |

It is certified that error appears in the above-identified patent and that said Letters Patent is hereby corrected as shown below:

In the Claims:

At column 10, claim number 11, line number 20, after "to" delete "the"

Signed and Sealed this
Fourth Day of November, 2014

Michelle K. Lee
*Deputy Director of the United States Patent and Trademark Office*